United States Patent Office 3,211,757
Patented Oct. 12, 1965

3,211,757
SYMMETRICAL 4-HALOGENO-4',4''-DIARYLAMI-
NO-TRIPHENYLMETHANE DYESTUFFS
Gustav Schäfer and Ferdinand Quint, Frankfurt am Main,
Germany, assignors to Farbwerke Hoechst Aktienge-
sellschaft vormals Meister Lucius & Brüning, Frankfurt
am Main, Germany, a corporation of Germany
No Drawing. Filed May 1, 1962, Ser. No. 191,422
Claims priority, application Germany, May 3, 1961,
F 33,832
6 Claims. (Cl. 260—393)

The present invention relates to symmetrical 4-halogeno-4',4''-diarylamino-triphenylmethane dyestuffs and to a process for their manufacture; more particularly it relates to dyestuffs corresponding to the following general formula

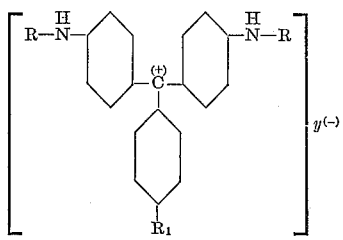

wherein R represents an aromatic radical which is substituted in meta- or para-position to the inmino group and which may contain further substitutents, $R_1$ represents a halogen atom and $y^{(-)}$ stands for a chloride, bromide or iodide ion.

Processes are known for reacting p-trihalogen-triphenylmethyl carbinols with aromatic amines and the hydrochloric acid salts thereof (cf. Ber 38 (1905), page 587). With this method, all three halogen atoms in the para position are exchanged for amine radicals and dyestuffs of the p-triarylamino-triphenylmethane series are obtained. The same is the case when reacting in this manner p-trimethoxy-triphenylmethyl carbinols (Ber. 37 (1904), page 2870), p-triamino-triphenylmethyl carbinols such as the p-rosaniline (cf. Fierz-David, Künstliche organische Farbstoffe, volume I (1926), pages 262/263), or the simple or complex salts of p-trihalogeno-triphenylmethyl carbinols (Belgian Patent 561,613), instead of the p-trihalogeno-triphenylmethyl carbinols.

By these known methods, however, the exchange of only one or two substituents in the para-position and the preparation of monoarylamino compounds or diarylamino compounds of the triphenylmethane series are not possible.

Now we have found, that symmetrical 4-halogeno-4',4''-diarylamino-triphenylmethane dyestuffs can be prepared by reacting 1 mol of a complex compound of a 4,4',4''-trihalogenotriphenylmethyl halide and aluminium chloride, ferric chloride or boron trifluoride with about 4 mols, suitably 4 to 4.4 mols, of a primary aromatic amine carrying a substituent in the meta- or para-position to the amino group, in the presence of inert organic solvents, at a temperature within the range of about 100° C. to 150° C., preferably between about 115° C. and 125° C., and hydrolyzing the complex compound of 4-halogeno-4',4''-diarylamino-triphenylmethyl halide and aluminium chloride, ferric chloride or boron trifluoride with dilute hydrohalic acid to obtain the 4-halogeno-4',4''-diarylamino-triphenylmethyl halide.

The complex compounds used as starting products are the 4,4',4''-trihalogeno-triphenylmethyl-tetrachloroaluminates, the 4,4',4''-trihalogeno-triphenylmethyl-tetrachloroferrates or the 4,4',4''-trihalogeno-triphenylmethyl-chloroboron trifluorides. The primary aromatic amines used which are substituted in the meta- or para-position to the amino group carry in one of these positions, for example, a halogen atom, an alkyl, aryl, hydroxy, alkoxy, phenoxy, phenylamino, β-hydroxyethylsulfone, trifluoromethyl, cyano, nitro, sulfonamide, sulfanilide, sulfonic acid ester or carboxylic acid ester group. Moreover, these arylamines may carry further substituents in the aromatic nucleus, for example the aforementioned groups.

As inert organic solvents, there may be used, for example, chlorobenzene, dichlorobenzene, trichlorobenzene, tertachloroethane or nitrobenzene. Mixtures of inert organic solvents may also be used.

The symmetrical 4-halogeno-4',4''-diarylamino-triphenlmethane dyestuffs formed by the process of the present invention are obtained in an almost quantative yield and in a very good purity. They are suitable for dyeing and printing synthetic fibrous materials, more especially shaped articles of polyacrylonitrile, and, when being sulfonated, they dye wool and silk bright green tints possessing good properties of fastness.

The following examples serve to illustrate the invention but they are not intended to limit it thereto, the parts being by weight unless otherwise stated and the relationship of parts by weight to parts by volume being the same as that of the kilogram to the litre.

Example 1

26 parts of 4,4',4''-trichlorotriphenylmethyl-tetrachloroaluminate, 28.1 parts of 1-amino-3-chlorobenzene and 125 parts by volume of chlorobenzene were reacted for 4 to 5 hours at 130° C. After cooling, the melt was diluted with 250 parts by volume of ether, the crystallized dyestuff was separated by filtration and washed with ether until the initially brown filtrate was colorless. The filteraed and washed dyestuff product was boiled with dilute hydrochloric acid and washed until neutral. The dyestuff in the form of the 4-chloro-4',4''-bis-(m-chlorophenylamino)-triphenylmethyl chloride was obtained in a very good yield.

From glacial acetic acid, the dyestuff was obtained in the form of green cubes having a brass luster which dissolved in methanol and glacial acetic acid to give a green solution.

Analysis [$C_{31}H_{22}N_2Cl_4$ (564)]:

|  | C | H | N | Cl |
|---|---|---|---|---|
| Calculated, percent | 66.0 | 3.90 | 4.96 | 25.2 |
| Found, percent | 65.9 | 4.2 | 4.9 | 24.8 |

When using instead of 1-amino-3-chlorobenzene an equimolecular amount of 1-amino-4-chlorobenzene and proceeding otherwise in the manner described above, the 4-chloro-4',4''-bis-(p-chlorophenylamino)-triphenylmethyl chloride was obtained in the form of a dark-green crystalline powder which contained 1 mol of water.

Analysis [$C_{31}H_{22}N_2Cl_4 \cdot H_2O$ (58)]:

|  | C | H | N | Cl | $H_2O$ |
|---|---|---|---|---|---|
| Calculated, percent | 64.05 | 4.13 | 4.81 | 24.4 | 3.09 |
| Found, percent | 64.4 | 4.4 | 4.7 | 25.1 | 2.99 |

When using instead of 1-amino-3-chlorobenzene an equimolecular amount of 1-amino-3-bromobenzene, the green dyestuff 4-chloro-4',4''-bis-(m-bromophenylamino)-triphenylmethyl chloride was obtained in the form of a brown powder in an amount of 98% of the theoretical yield.

When using instead of 1-amino-3-chlorobenzene an equimolecular amount of 1-amino-4-bromobenzene, the 4-chloro-4',4''-bis-(p-bromophenylamino)-triphenylmethyl chloride was obtained in an almost quantitative yield in the form of a dark-green powder which dissolved in glacial acetic acid and methanol to give a green solution.

When using instead of chlorobenzene, dichlorobenzene or trichlorobenzene as inert solvent and proceeding otherwise in the manner described above, the said dyestuffs were obtained in an equal yield and purity.

When using instead of the 1-amino-3-chlorobenzene an equimolecular amount of 1-amino-4-fluorobenzene, the 4-chloro-4',4''-bis-(p-fluorophenylamino) - triphenylmethyl chloride was obtained in an almost quantitative yield in the form of a green powder having a brass luster.

*Example 2*

52 parts of 4,4',4'' - trichlorotriphenylmethyl - tetrachloroaluminate were introduced into the solution of 47 parts of 1-amino-4-methylbenzene and 100 parts by volume of chlorobenzene and the mixture was heated for 5 hours at 130° C. The reaction mixture obtained was then poured into dilute hydrochloric acid and the chlorobenzene was blown off. A dark-brown dyestuff powder was obtained which dissolved for example in glacial acetic acid, methanol or acetone to give a green solution. It represented the 4-chloro-4',4''-bis-(p-methylphenylamino)-triphenylmethyl chloride. The yield amounted to 96% of the theoretical value.

When using instead of 1-amino-4-methylbenzene an equimolecular amount of 1 aminonaphthalene, the 4-chloro-4',4''-bis-(α-napthylamino) - triphenylmethyl chloride was obtained in the form of a blue-green crystalline powder. The yield amounted to 99.2% of the theoretical value.

Analysis [$C_{39}H_{28}N_2Cl_2 \cdot 1.5H_2O$ (622)]:

|  | C | H | $H_2O$ |
|---|---|---|---|
| Calculated, percent | 75.35 | 4.5 | 4.34 |
| Found, percent | 75.1 | 4.7 | 4.21 |

*Example 3*

125 parts of 4-chlorobenzotrichloride were added dropwise within 5 hours, at 50° C. to 60° C., to a suspension of 80 parts of aluminium chloride in 400 parts by volume of chlorobenzene. The mixture was then stirred for 5 hours at the same temperature. The condensation product 4,4',4''-trichlorotriphenylmethyl-tetrachloroaluminate obtained crystallized in the form of lamellae having a brass luster. The excess chlorobenzene was removed by means of a built-in glass frit and the remaining product was washed whith chlorobenzene until the filtrate was clear. The glass frit was then removed, 213 parts of 1-amino-3-methylbenzene diluted with 150 parts by volume of chlorobenzene were added and the mixture was heated to 125° C. to 130° C. A vigorous reaction set in when this temperature was reached, the melt turned green and the surface had a strong copper bronze luster while the temperature rose to 140° C. to 145° C. The mixture was then after-stirred for a further 1 to 2 hours at 120° C. The melt was then poured into dilute hydrochloric acid and the chlorobenzene was blown off. The green dyestuff 4 - chloro - 4',4''-bis-(m-methylphenylamino)-triphenylmethyl chloride was obtained in the form of a dark-violet bronzing powder. The yield corresponded to the theoretical. The dyestuff dissolved for example in glacial acetic acid, methanol or acetone to give an emerald-green solution. From dioxane, chlorobenzene/acetone or nitrobenzene/petroleum ether the dyestuff crystallized in the form of small green needles having a brass luster.

Analysis [$C_{33}H_{28}N_2Cl_2$ (523)]:

|  | C | H | N | Cl |
|---|---|---|---|---|
| Calculated, percent | 75.7 | 5.35 | 5.35 | 13.6 |
| Found, percent | 75.4 | 5.5 | 5.2 | 13.4 |

When using, instead of the 4,4',4''-trichlorotriphenylmethyl - tetrachloroaluminate, 4,4',4'' - trichlorotriphenylmethyl-tetrachloroferrate which was prepared in the same manner by using an equimolecular amount of ferric chloride, or the corresponding boron trifluoride complex compound prepared from 4,4',4''-trichlorotriphenylmethyl chloride and boron trifluoride, the same dyestuff was obtained in an equally good yield.

The dyestuff was also prepared from the red 4,4'-dichloro - 4'' - (m - methylphenylamino)-triphenylmethyl chloride. For this purpose 7 parts of aluminium chloride and 22.6 parts of 4,4'-dichloro-4''-(m-methylphenylamino)-triphenylmethyl chloride were introduced into the solution of 10.7 parts of 1-amino-3-methylbenzene in 15 parts by volume of chlorobenzene, the mixture was heated for 5 hours at 130° C. and worked up in the manner described above.

*Example 4*

26 parts of 4,4',4'' - trichlorotriphenylmethyl - tetrachloroaluminate, 31 parts of 1-amino-4-ethoxybenzene and 50 parts by volume of chlorobenzene were stirred for 3 to 4 hours at 120° C. The green melt obtained was poured into dilute hydrochloric acid and the chlorobenzene was blown off. 4 - chloro - 4',4''-bis-(p-ethoxyphenylamino)-triphenylmethyl chloride was obtained in a quantitative yield in the form of a brown bronzing powder which dissolved in glacial acetic acid and methanol to give a green solution.

When using instead of 1-amino-4-ethoxybenzene an equimolecular amount of 1 - amino - 4 - methoxybenzene and proceeding otherwise in the manner described above, the 4-chloro-4',4''-bis-(p-methoxyphenylamino)-triphenylmethyl chloride was also obtained in a quantitative yield.

When using instead of 1-amino-4-ethoxybenzene an equimolecular amount of 1 - amino - 3 - methyl-5-chlorobenzene, 4 - chloro - 4',4''-bis-(3-chloro-5-methylphenylamino)-triphenylmethyl chloride was obtained in the form of a green powder containing 1 mol of crystal water. The yield corresponded to the theoretical.

Analysis [$C_{33}H_{26}N_2Cl_4 \cdot H_2O$ (610)]:

|  | N | Cl | $H_2O$ |
|---|---|---|---|
| Calculated, percent | 4.58 | 23.3 | 2.95 |
| Found, percent | 4.5 | 23.3 | 2.1 |

*Example 5*

16 parts of 4,4',4'' - trichlorotriphenylmethyl - tetrachloroaluminate, 35.5 parts of 1-amino-3-trifluoromethylbenzene and 150 parts by volume of chlorobenzene were heated for 5 to 6 hours at 120° C. After about one hour, the dyestuff separated spontaneously in the form of crystals. The thick crystal mass was diluted with chlorobenzene, poured into dilute hydrochloric acid and the chlorobenzene was blown off. There was obtained the 4 - chloro-4',4''-bis-(m-trifluoromethylphenylamino)-triphenyl methyl chloride in a very good yield in the form of a blue-green powder, from which the 4-chloro-4',4''-bis - (m - trifluoromethylphenylamino)-triphenylmethyl perchlorate was prepared in the form of small needles having a brass luster.

Analysis [$C_{33}H_{22}O_4N_2Cl_2F_6$ (695)]:

|  | C | H | N |
|---|---|---|---|
| Calculated, percent | 57.0 | 3.17 | 4.03 |
| Found, percent | 57.1 | 3.6 | 3.8 |

When using instead of 1-amino-3-trifluoromethylbenzene an equimolecular amount of 1-amino-3-cyanbenzene, there was obtained the 4-chloro-4',4''-bis-(m-cyanophenylamino)-triphenylmethyl chloride in a yield of 91% of the theoretical value in the form of a green powder having a copper luster which dissolved in glacial acetic acid to give a green solution.

*Example 6*

26 parts of 4,4',4''-trichlorotriphenylmethyl-tetrachloroaluminate, 38 parts of aniline-3-sulfonic acid amide and 50 parts by volume of nitrobenzene were heated for 5 hours at 120° C. After blowing off the nitrobenzene, there were obtained from the green melt small olive-green microcrystalline needles of the 4-chloro-4',4''-bis-(m - sulfamidophenylamino) - triphenylmethyl chloride which dissolved in glacial acetic acid and methanol to give a green solution. The yield was almost quantitative.

When using instead of aniline-3-sulfamide an equimolecular amount of aniline-3-sulfanilide, 4-chloro-4',4''-bis-(m-sulfanilidophenylamino)-triphenylmethyl chloride was obtained in a yield of 99% of the theoretical value in the form of a microcrystalline bronzing powder.

*Example 7*

26 parts of 4,4',4''-trichlorotriphenylmethyl-tetrachloroaluminate, 30.4 parts of 1-amino-3-nitrobenzene and 150 parts by volume of nitrobenzene were heated for 5 hours at 120° C. After about one hour, the dyestuff 4-chloro-4',4''-bis-(m-nitrophenylamino)-triphenylmethyl chloride crystallized in the form of small needles having a green luster. The yield was quantitative.

Analysis [$C_{31}H_{22}O_4N_4Cl_2 \cdot 2.5H_2O$ (630)]:

|  | C | H | $H_2O$ |
|---|---|---|---|
| Calculated, percent | 59.1 | 4.29 | 7.15 |
| Found, percent | 58.5 | 4.4 | 7.1 |

When using 1-amino-4-nitrobenzene instead of 1-amino-3-nitrobenzene the 4-chloro - 4',4'' - bis - (p - nitrophenylamino)-triphenylmethyl chloride was also obtained in a quantitative yield.

*Example 8*

26 parts of 4,4',4''-trichlorotriphenylmethyl-tetrachloroaluminate, 36.3 parts of 3-aminobenzoic acid ethyl ester and 120 parts by volume of chlorobenzene were heated for 5 hours at 120° C. From the green melt the dyestuff crystallized after about 1 hour. After the usual processing in the manner described in Examples 3 and 4, the 4-chloro-4',4''-bis - (m-carbethoxyphenylamino) - triphenylmethyl chloride was obtained in the form of a dark-brown bronzing powder which dissolved in glacial acetic acid and methanol to give a green solution. The yield was quantitative.

Analysis [$C_{37}H_{32}O_4N_2Cl_2$ (639)]:

|  | C | H |
|---|---|---|
| Calculated, percent | 69.4 | 5.02 |
| Found, percent | 69.1 | 5.2 |

When using instead of 3-aminobenzoic acid ethyl ester an equimolecular amount of 4-aminobenzoic acid ethyl ester, the 4-chloro-4',4''-bis-(p-carbethoxyphenylamino)-triphenylmethyl chloride was obtained in the form of a black powder which dissolved, for example, in glacial acetic acid or methanol to give a green solution.

When using 3-aminobenzene sulfonic acid ethyl ester instead of 3-aminobenzoic acid ethyl ester and proceeding otherwise in the manner described in the first paragraph of this example, the 4-chloro-4',4''-bis-(n-sulfoneethoxy - phenylamino) - triphenylmethyl chloride was obtained which dissolved very easily in organic solvents to give a green solution.

*Example 9*

46.6 parts of 4,4',4''-trifluorotriphenylmethyl-tetrachloroaluminate prepared in the manner described in Example 3 from fluorobenzene, 4-fluorobenzotrichloride and aluminium chloride, 42.8 parts of 1-amino-3-methylbenzene and 100 parts by volume of chlorobenzene were heated for 60 to 90 minutes at 120° C. After processing in the manner described in Examples 3 and 4, the 4-fluoro-4',4''-bis-(m-methylphenylamino)-triphenylmethyl chloride was obtained in a very good yield in the form of a green powder.

When using instead of 4,4',4''-trifluorotriphenylmethyl-tetrachloroaluminate the corresponding 4,4',4''-tribromo or 4,4',4''-triiodo compound and proceeding otherwise as described above, the 4-bromo-4',4''-bis-(m-methylphenylamino)-triphenylmethyl chloride or the 4-iodo-4',4''-bis-(m - methylphenylamino) - triphenylmethyl chloride was also obtained in a very good yield.

*Example 10*

15.2 parts of 4,4'-dibromo - 4''-chlorotriphenylmethyl-tetrachloroaluminate prepared by the method described in Example 3 from bromobenzene and p-chlorobenzotrichloride, 11.8 parts of 1-amino-3-methylbenzene and 30 parts by volume of chlorobenzene were heated for 1 hour at 120° C. After having worked up as described in Example 3, a mixture of 4,4'-bis-(m-methylphenylamino)-4''-chlorotriphenylmethyl chloride and 4,4'-bis-(m-methylphenylamino)-4''-bromotriphenylmethyl chloride was obtained.

When using instead of 4,4'-dibromo-4''-chlorotriphenylmethyl-tetrachloroaluminate 24.2 parts of 4,4'-difluoro-4'' - chloro - triphenylmethyl - tetrachloroaluminate, 21.4 parts of 1-amino-3-methylbenzene and 30 parts by volume of chlorobenzene and heating the mixture for 1 to 2 hours at 120° C., a green bronzing powder was obtained in a yield of 90% of the theoretical value which, according to the analysis, was a mixture of 4,4' - bis - (m - methylphenylamino) - 4'' - chlorotriphenylmethyl chloride and 4,4' - bis - (m - methylphenylamino) - 4''-fluorotriphenylmethyl chloride.

*Example 11*

52 parts of 4,4',4''-trichlorotriphenylmethyl-tetrachloroaluminate were suspended in 75 parts by volume of tetrachloroethane. After the addition of 47 parts of 1-amino-3-methylbenzene, the mixture was heated within 15 minutes to 130° C. A vigorous reaction set in, the melt turned green and the temperature rose to 145° C. The melt was stirred for one hour at 120° C., poured into dilute hydrochloric acid and the tetrachloroethane was blown off by steam. The green dyestuff 4-chloro-4',4''-bis-(m-methylphenylamino)-triphenylmethyl chloride was obtained in an almost theoretical yield and was identical with the dyestuff obtained according to Example 3.

*Example 12*

52 parts of 4,4',4''-trichlorotriphenylmethyl-tetrachloroaluminate were suspended in 125 parts by volume of nitrobenzene and heated to 100° C. After the addition of 80.5 parts of 3-aminophenyl-β-hydroxyethylsulfone, the temperature was increased to 130° C. and this temperature was maintained for 8 hours. The melt was introduced into dilute hydrochloric acid and the nitrobenzene was blown off with steam. The green dyestuff 4 - chloro - 4',4'' - bis - (m - hydroxyethylsulfonylphenylamino)-triphenylmethyl chloride was obtained in a very good yield in the form of a bronzing green powder.

We claim:
1. A symmetrical dyestuff having the formula

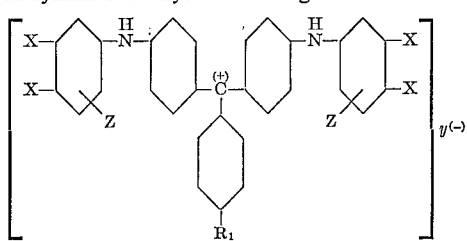

wherein one corresponding X on each benzene nucleus stands for a hydrogen atom and the other corresponding X on each benzene nucleus stands for the same member of the group consisting of a halogen atom, a lower alkyl, lower alkoxy, β-hydroxyethylsulfone, trifluoromethyl, cyano, nitro, sulfonamide, sulfanilide, sulfonic acid lower alkyl ester and carboxylic acid lower alkyl ester group, Z represents the same member of the group consisting of a hydrogen atom and a halogen atom in the meta position, $R_1$ represents a halogen atom, and $y^{(-)}$ represents a member of the group consisting of a chloride, bromide and iodide ion.

2. The dyestuff having the formula

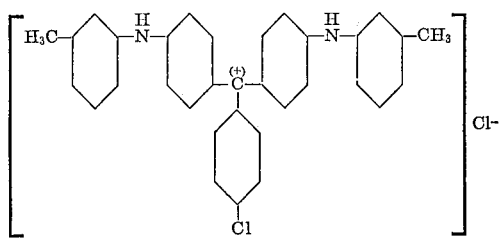

3. The dyestuff having the formula

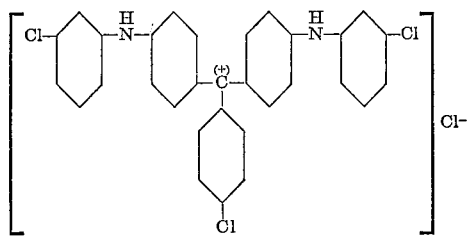

4. The dyestuff having the formula

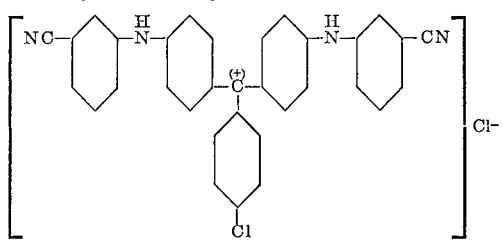

5. The dyestuff having the formula

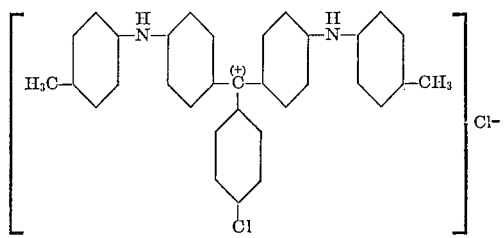

6. The dyestuff having the formula

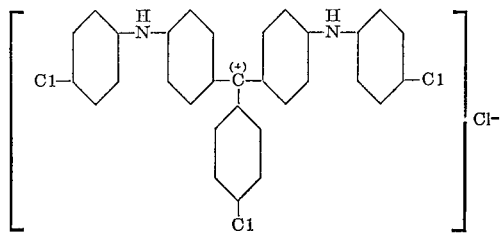

References Cited by the Examiner

UNITED STATES PATENTS 1,890,154  12/32  Ingram _____ 260—393 X
2,755,203  7/56   Stallmann _____ 260—393 X

FOREIGN PATENTS 535,718    8/55   Belgium.
1,098,652  2/61   Germany.

LORRAINE A. WEINBERGER, *Primary Examiner.*
HAROLD G. MOORE, LEON ZITVER, *Examiners.*